(12) United States Patent
Fujita et al.

(10) Patent No.: US 10,173,131 B2
(45) Date of Patent: Jan. 8, 2019

(54) DISPLAY DEVICE AND GAME MACHINE (71) Applicant: OMRON Corporation, Kyoto-shi, Kyoto (JP)

(72) Inventors: Junya Fujita, Aichi (JP); Jun Kishimoto, Gifu (JP); Yuji Hirose, Kyoto (JP)

(73) Assignee: OMRON Corporation, Kyoto (JP)

(*) Notice: Subject to any disclaimer, the term of this patent is extended or adjusted under 35 U.S.C. 154(b) by 468 days.

(21) Appl. No.: 15/130,551

(22) Filed: Apr. 15, 2016

(65) Prior Publication Data
US 2016/0306098 A1    Oct. 20, 2016

(30) Foreign Application Priority Data

Apr. 15, 2015 (JP) ................. 2015-083631

(51) Int. Cl.
*A63F 13/25* (2014.01)
*F21V 8/00* (2006.01)
*G09G 3/00* (2006.01)
*G09G 3/36* (2006.01)
*A63F 7/02* (2006.01)

(52) U.S. Cl.
CPC ............ *A63F 13/25* (2014.09); *G02B 6/006* (2013.01); *G02B 6/0036* (2013.01); *G02B 6/0068* (2013.01); *A63F 7/022* (2013.01); *G09G 3/001* (2013.01); *G09G 3/36* (2013.01); *G09G 2300/023* (2013.01)

(58) Field of Classification Search
None
See application file for complete search history.

(56) References Cited

U.S. PATENT DOCUMENTS

2003/0169384 A1    9/2003   Ohkawa
2008/0278659 A1*  11/2008   Park ................. G02B 6/002
                                                         349/65

(Continued)

FOREIGN PATENT DOCUMENTS

JP    2002-62435 A      2/2002
JP    2005-353544 A    12/2005

(Continued)

OTHER PUBLICATIONS

Notification of Reason for Refusal issued in Japanese Application No. 2015-083631, dated Aug. 14, 2018 (4 pages).

*Primary Examiner* — Dmitry Suhol
*Assistant Examiner* — Brandon Gray
(74) *Attorney, Agent, or Firm* — Osha Liang LLP (57) ABSTRACT

A display device has a display panel including an image display area in which an image is displayable, a light guide plate arranged at a back of the display panel, the light guide plate comprising a transparent material and having a first incident surface and a second incident surface, a first light source facing the first incident surface, a second light source facing the second incident surface, and a controller configured to control turning on and turning off of the first light source and the second light source and to control an image displayed on the display panel. The light guide plate includes an emission surface facing the display panel, and a plurality of first prisms arranged in an area in correspondence with the image display area on a surface opposite to the emission surface.

7 Claims, 8 Drawing Sheets (56) References Cited

U.S. PATENT DOCUMENTS

| | | | |
|---|---|---|---|
| 2008/0316744 A1 | 12/2008 | Hirota et al. | |
| 2012/0051088 A1 | 3/2012 | Chui et al. | |
| 2015/0029745 A1* | 1/2015 | Asano ................ | G02B 6/0038 |
| | | | 362/606 |

FOREIGN PATENT DOCUMENTS

| | | |
|---|---|---|
| JP | 2006-075362 A | 3/2006 |
| JP | 2007-097799 A | 4/2007 |
| JP | 2008-180918 A | 8/2008 |
| JP | 2013-182247 A | 9/2013 |
| JP | 2014-50588 A | 3/2014 |
| WO | 2014/010585 A1 | 1/2014 |

* cited by examiner

DISPLAY DEVICE AND GAME MACHINE

BACKGROUND

Field

The present invention relates to a display device that displays an image on which a pattern is superimposed, and to a game machine including such a display device.

Related Art

To enhance visual effects, display devices may have a plurality of layered display areas stacked on top of another to switch letters, patterns, or designs appearing in selected display areas (refer to, for example, Patent Literature 1).

For example, a decorative display device described in Patent Literature 1 includes a first display plate and a second display plate, which are light guide plates with designs for diffusing light, a support, which supports the first display plate and the second display plate in a removable manner, a first light source and a second light source, which are mounted on the support to illuminate an end face of the first display plate and an end face of the second display plate, and a controller for controlling the lighting patterns of the first light source and the second light source. The first display plate is arranged in front of the second display plate. The first display plate and the second display plate partially or entirely overlap with each other to form a predetermined image pattern.

CITATION LIST

Patent Literature

Patent Literature 1: Japanese Unexamined Patent Application Publication No. 2007-97799

SUMMARY

However, the decorative display device described in Patent Literature 1 can change its display designs only within the limited combinations of patterns predefined on the two display plates. The demand is increasing for display devices with higher visual effects.

One or more aspects of the present invention are directed to a display device that can switch whether to display a variable image together with another pattern superimposed on the image.

One aspect of the invention provides a display device including a display panel, a light guide plate, a first light source, a second light source, and a controller. The display panel includes an image display area in which an image is displayable. The light guide plate is arranged at a back of the display panel. The light guide plate is formed from a transparent material and has a first incident surface and a second incident surface. The first light source faces the first incident surface. The second light source faces the second incident surface. The controller controls turning on and turning off of the first light source and the second light source and controls an image displayed on the display panel. The light guide plate includes an emission surface, a plurality of first prisms, and a plurality of second prisms. The emission surface faces the display panel. The plurality of first prisms are arranged on a surface opposite to the emission surface. The plurality of first prisms reflect light emitted from the first light source and entering the guide plate through the first incident surface toward the emission surface to illuminate the entire display area of the display panel with the light emitted from the first light source and entering the guide plate through the first incident surface. The plurality of second prisms are arranged on the surface opposite to the emission surface in a first pattern of light emitted from the second light source and entering the guide plate through the second incident surface. The plurality of second prisms reflect light emitted from the second light source and entering the guide plate through the second incident surface toward the emission surface to cause the first pattern of light to be superimposed in the image display area of the display panel.

The display device may further include a second display panel arranged at a back of the light guide plate to display an image viewable through the light guide plate and the display panel. The controller controls an image displayed on the second display panel.

The display device may further include a third light source facing a third incident surface of the light guide plate. The light guide plate includes a plurality of third prisms arranged on the surface opposite to the emission surface in a second pattern of light emitted from the third light source and entering the light guide plate through the third incident surface. The plurality of third prisms reflect light emitted from the third light source and entering the light guide plate through the third incident surface toward the emission surface to allow the second pattern of light to be superimposed in the image display area of the display panel. The second pattern is different from the first pattern. The controller controls turning on and turning off of the third light source.

Another aspect of the invention provides a game machine. The game machine includes a game machine unit, and a display device arranged on a surface of the game machine unit to face a player of the game machine. The display device may be any display device described above.

The display device according to one or more embodiments of the present invention can switch whether to display a variable image together with another pattern superimposed on the image.

DETAILED DESCRIPTION

A display device according to embodiments of the present invention will now be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The display device includes a light guide plate arranged at the back of a display panel for displaying an image. The light guide plate can switch between entire lighting and patterned lighting by selectively turning on a plurality of light sources and thus can allow a viewer to view an image alone or an image together with a pattern superimposed on the image. The display device further includes a second display panel arranged at the back of the light guide plate, and allows a viewer to view an image displayed on the second display panel through the light guide plate and the display panel by turning off the light sources.

For ease of explanation, the side of the display device facing the viewer refers to the front, and its opposite refers to the back.

Figure 1:
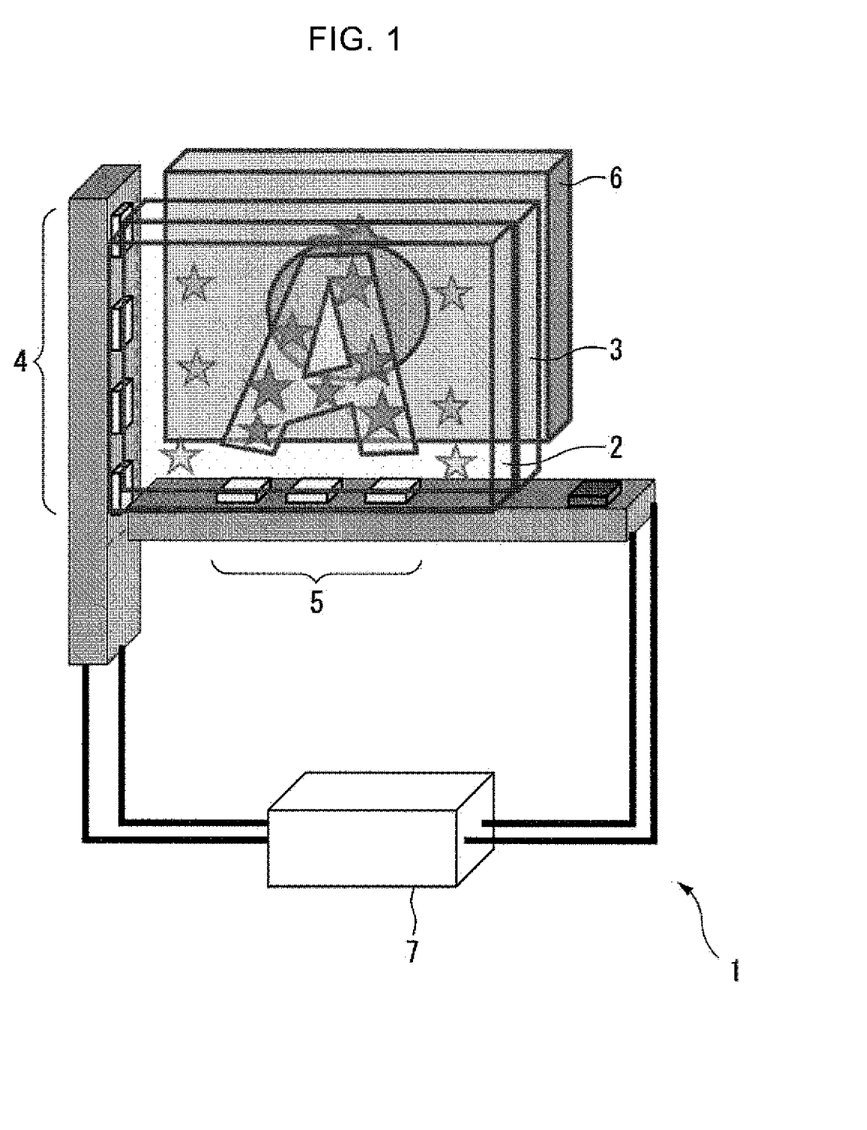
FIG. 1 is a schematic diagram showing a display device according to one embodiment of the present invention.

FIG. 1 is a schematic diagram showing a display device according to one embodiment of the present invention. A display device 1 includes a first liquid crystal panel 2, a light guide plate 3, a first light source 4, a second light source 5, a second liquid crystal panel 6, and a controller 7. The first liquid crystal panel 2, the light guide plate 3, and the second liquid crystal panel 6 are arranged in the stated order from the front toward the back. The first light source 4 and the second light source 5 are arranged to face incident surfaces formed on different side walls of the light guide plate 3.

The first liquid crystal panel 2 is an example of a display panel. The first liquid crystal panel 2 includes a display area for displaying an image, and displays an image in the display area in accordance with an image signal provided from the controller 7. For example, the first liquid crystal panel 2 includes a liquid crystal layer containing liquid crystal molecules, two transparent electrodes formed from, for example, indium tin oxide (ITO), which are arranged to face each other across the liquid crystal layer, two transparent substrates formed from glass or transparent resin, which are arranged to face each other across the liquid crystal layer and the transparent electrodes, and two polarizing plates, which are arranged to face each other across the liquid crystal layer, the transparent electrodes, and the transparent substrates. The first liquid crystal panel 2 may further include alignment membranes between the liquid crystal layer and the transparent electrodes for aligning the liquid crystal molecules. One of the transparent electrodes is formed in a matrix to allow voltage to be applied in units of pixels in accordance with an image signal. To display a color image, the first liquid crystal panel 2 may further include color filters arranged in a predetermined pattern in units of pixels between one of the transparent electrodes and its transparent substrate.

The two alignment membranes may align the liquid crystal molecules in the liquid crystal layer in a predetermined direction. To align, for example, the crystal molecules in a twisted nematic configuration in the liquid crystal layer, the two alignment membranes are arranged to have their alignment directions orthogonal to each other. The two polarizing plates pass polarizing components having polarization planes in specific directions. For example, the two polarizing plates are arranged to have their transmission axes orthogonal to each other to allow the liquid crystal panel 2 to operate in a normally white (NW) mode. When no electrical field is applied between the two transparent electrodes having the liquid crystal layer sandwiched between them, or in other words no image signal is input, the polarizing direction of the light that has passed through the polarizing plate at the back rotates by 90 degrees at the liquid crystal layer. As a result, the light can pass through the polarizing plate arranged at the front. In this state, the first liquid crystal panel 2 is transparent. When an electrical field in accordance with an image signal is applied between the two transparent electrodes having the liquid crystal layer sandwiched between them, the liquid crystal molecules in the liquid crystal layer are aligned in a direction nearer the direction parallel to the direction of the electrical field. As a result, the polarization plane of the light that passes through the liquid crystal layer rotates by a smaller degree in accordance with the strength of the electrical field. As a larger voltage is applied in accordance with an image signal, or in other words as a more white image is displayed, a smaller portion of the light that has passed through the polarizing plate arranged at the back passes through the polarizing plate arranged at the front. In this state, the first liquid crystal panel 2 is more opaque.

The polarizing plates may be arranged to have their transmission axes parallel to each other to allow the first liquid crystal panel 2 to operate in a normally black (NB) mode. When an electrical field is applied between the two transparent electrodes having the liquid crystal layer sandwiched between them, the first liquid crystal panel 2 becomes transparent. When no electrical field is applied between the two transparent electrodes having the liquid crystal layer sandwiched between them, the first liquid crystal panel 2 becomes opaque.

The first liquid crystal panel 2 may not be a liquid crystal panel with the structure described above. The first liquid crystal panel 2 may be any display panel that can display an image in accordance with an image signal provided from the controller 7 and can change the degree of transparency in accordance with the applied voltage.

The light guide plate 3 illuminates the first liquid crystal panel 2 from the backside with light emitted from the first light source 4 or with light emitted from the second light source 5. The light guide plate 3 passes light representing the image displayed by the second liquid crystal panel 6 arranged at the back of the light guide plate 3 toward the liquid crystal panel 2. To allow this, the light guide plate 3 is a sheet member with an area larger than the display area of the first liquid crystal panel 2. The light guide plate 3 is arranged to face the back surface of the first liquid crystal panel 2. The light guide plate 3 is prepared by molding of a resin transparent to visible light, such as polymethyl methacrylate (PMMA), polycarbonate, or cycloorefin polymer.

Figure 2:
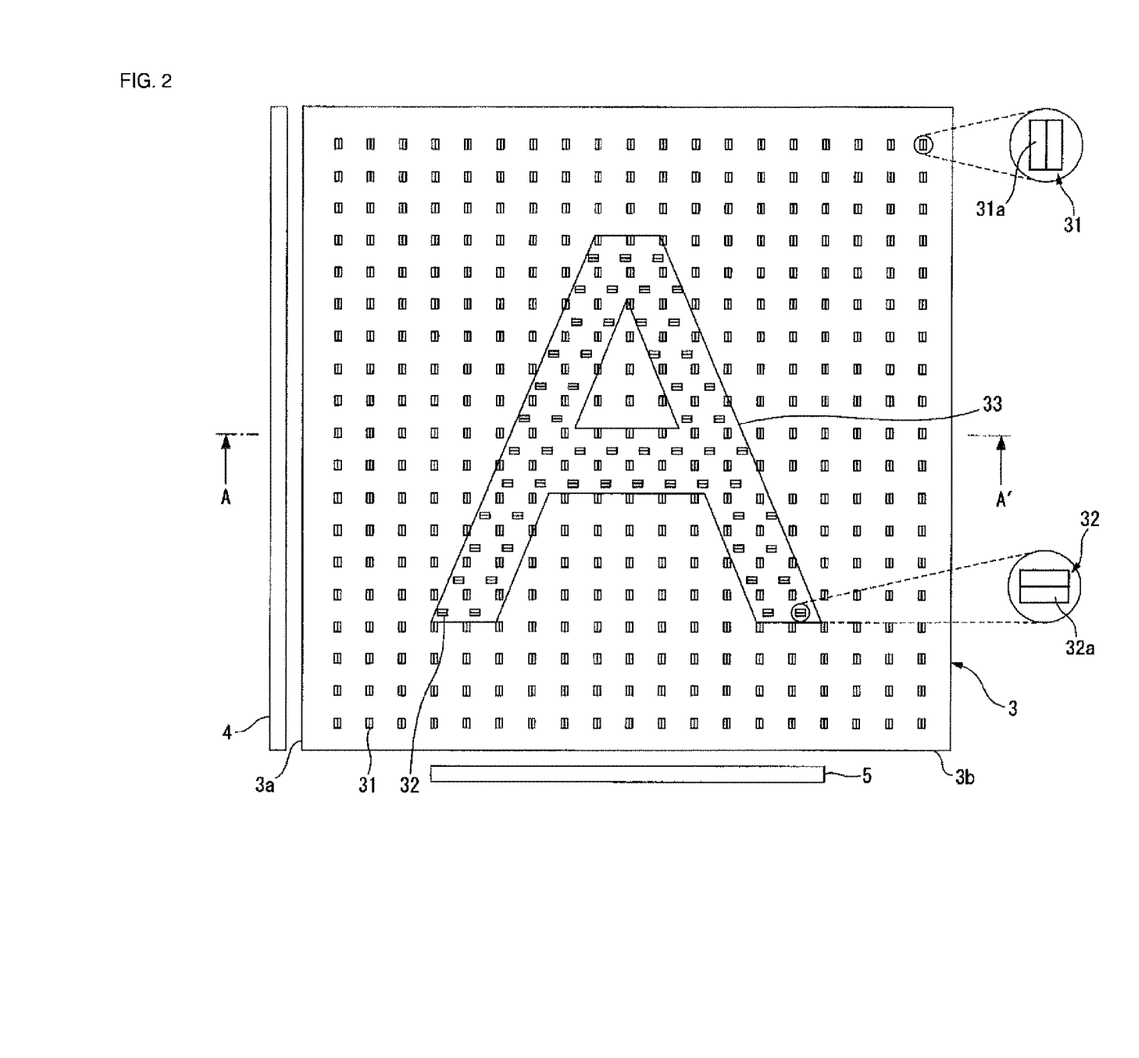
FIG. 2 is a schematic front view of a light guide plate.
Figure 3:
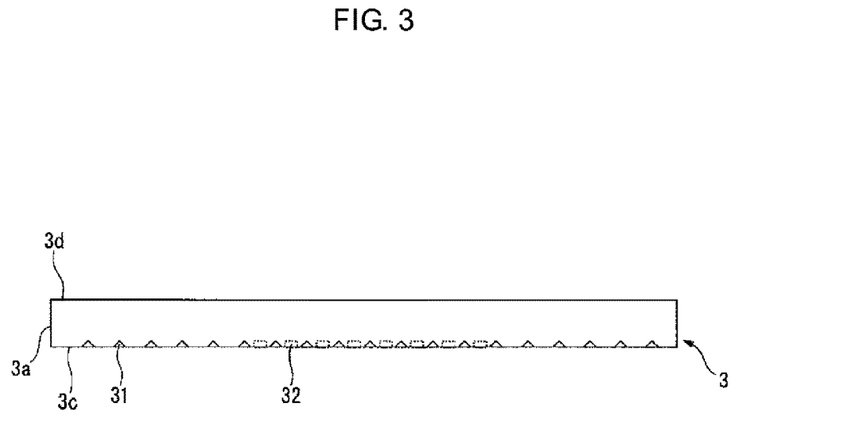
FIG. 3 is a schematic sectional side view of the light guide plate taken along line A-A' in FIG. 2.

FIG. 2 is a schematic front view of the light guide plate 3. FIG. 3 is a schematic sectional side view of the light guide plate 3 taken along line A-A' in FIG. 2. As shown in FIGS. 2 and 3, one side wall surface of the light guide plate 3 functions as an incident surface 3a facing the first light source 4. Another side wall surface orthogonal to the incident surface 3a functions as an incident surface 3b facing the second light source 5. The incident surface 3b may be a convex surface toward the second light source 5 to function as a collimating lens, which will enhance the directivity of incident light from the second light source 5.

The light guide plate 3 has a diffusion surface 3c at its back, on which a plurality of first prisms 31 are arranged in a lattice with a predetermined pitch in an area overlapping with the display area of the first liquid crystal panel 2 as viewed from the front. The first prisms 31 may be arranged in a zigzag with a predetermined pitch. The first prisms 31 reflect light from the first light source 4 incident on the incident surface 3a toward an emission surface 3d located opposite to the diffusion surface 3c and facing the back surface of the first liquid crystal panel 2. As a result, the light is emitted from the emission surface 3d at a substantially right angle to uniformly illuminate the entire display area of the first liquid crystal panel 2.

On the diffusion surface 3c, a plurality of second prisms 32 are further arranged in a zigzag with a predetermined pitch in a pattern 33. The second prisms 32 may be arranged in a lattice with a predetermined pitch. The second prisms 32 reflect light from the second light source 5 incident on the incident surface 3b toward the emission surface 3d. As a result, the light is emitted from the emission surface 3d at a substantially right angle to cause the pattern 33 to be superimposed on an image displayed in the display area of the first liquid crystal panel 2. The pattern 33 may be any pattern in which the second prisms 32 can be arranged.

In FIGS. 2 and 3, the sizes of the first prisms 31 and the second prisms 32 and the thickness of the light guide plate 3 are exaggerated for purposes of illustration.

For example, each first prism 31 is a substantially triangular groove with a predetermined length on the diffusion surface 3c. Each first prism 31 forms a predetermined angle with the diffusion surface 3c, and has a reflective surface 31a oriented to face the first light source 4. In the same manner, each second prism 32 is a substantially triangular groove with a predetermined length on the diffusion surface 3c. Each second prism 32 forms a predetermined angle with the diffusion surface 3c, and has a reflective surface 32a oriented to face the second light source 5. In the present embodiment, the first light source 4 is arranged to face the incident surface 3a, and the second light source 5 is arranged to face the incident surface 3b. The incident surface of the first light surface 4 is thus orthogonal to the incident surface of the second light source 5. As a result, the light emitting surface of the first light source 4 and the light emitting surface of the second light source 5 are orthogonal to each other. The reflective surface 31a and the reflective surface 32a are also orthogonal to each other on a plane parallel to the diffusion surface 3c. The predetermined angle is set at an angle that allows total reflection of the light from the first light source 4 or from the second light source 5 entering the light guide plate 3 toward the emission surface 3d. For example, the predetermined angle is in a range of 40 to 50 degrees with respect to the diffusion surface 3c. The predetermined length is set, for example, in a range of about 100 micrometers to a few millimeters.

As described above, the light from the first light source 4 enters the light guide plate 3 through the incident surface 3a. The light traveling inside the light guide plate 3 is totally reflected by each of the first prisms 31 on the diffusion surface 3c, and then is emitted from the emission surface 3d. Thus, the light from the first light source 4 illuminates the entire display area of the first liquid crystal panel 2 while the first light source 4 is turned on, allowing the viewer to view the entire image displayed on the first liquid crystal panel 2.

The light from the second light source 5 enters the light guide plate 3 through the incident surface 3b. The light traveling inside the light guide plate 3 is totally reflected by each of the second prisms 32 on the diffusion surface 3c, and then is emitted from the emission surface 3d. With the second prisms 32 being arranged in the pattern 33, the viewer can view the illuminating pattern 33 in the display area of the first liquid crystal panel 2 while the second light source 5 is turned on. In this structure, only an area of the first liquid crystal panel 2 reached by light from the pattern 33 is illuminated with the light from the pattern 33. When an image is displayed on the first liquid crystal panel 2, the viewer can view a portion of the image on the first liquid crystal panel 2 overlapping with the pattern 33.

The prisms 31 and the prisms 32 may be formed to fall within the upper limit of the layout density, which is the ratio of the area occupied by the prisms 31 or the prisms 32 to the area of the diffusion surface 3c. More specifically, the prisms 31 and the prism 32 may have the layout density set to allow an image displayed on the second liquid crystal panel 6 arranged at the back of the light guide plate 3 to be viewable by the viewer as if the image is being viewed through a transparent member or through an empty space when the liquid crystal panel 2 is transparent and the first and second light sources 4 and 5 are turned off. For example, the prisms 31 and the prisms 32 may both have a layout density of 30.0% or less.

In some embodiments, the prisms 31 and the prisms 32 may be formed to fall within the upper limit of the haze value, which is the ratio of the diffusion light to the total transmission light. More specifically, the prisms 31 and the prisms 32 may have the haze value set to allow an image displayed on the second liquid crystal panel 6 arranged at the back of the light guide plate 3 to be viewable by the viewer as if the image is being viewed through a transparent member or through an empty space when the liquid crystal panel 2 becomes transparent. For example, the prisms 31 and the prisms 32 may both have a haze value of 28% or less.

The first light source 4 includes an emitter element, such as a white light emitting diode or a fluorescent lamp, with its light emitting surface facing the incident surface 3a of the light guide plate 3. For example, the first light source 4 is arranged to have the direction with the highest intensity of light orthogonal to the incident surface 3a. The first light source 4 may include a plurality of emitter elements. In this case, the plurality of emitter elements are aligned in the longitudinal direction of the incident surface 3a within the range substantially the same as the width of the display area of the first liquid crystal panel 2. The first light source 4 is turned on or off in accordance with a control signal provided from the controller 7.

The second light source 5 includes an emitter element, such as a white light emitting diode or a fluorescent lamp. The second light source 5 is arranged to have its light emission surface facing the incident surface 3b of the light guide plate 3. For example, the second light source 5 is arranged to have the direction with the highest intensity of light orthogonal to the incident surface 3b. The second light source 5 may include a plurality of emitter elements in the same manner as for the first light source 4. In this case, the plurality of emitter elements are aligned in, for example, the longitudinal direction of the incident surface 3b within the range substantially the same as the width of the pattern 33 as viewed from the incident surface 3b. The second light source 5 is turned on or off in accordance with a control signal provided from the controller 7.

The second liquid crystal panel 6 is an example of a second display panel. The second liquid crystal panel 6 is arranged at the back of the light guide plate 3 to have its display surface facing the diffusion surface 3c of the light guide plate 3. The second liquid crystal panel 6 displays an image in accordance with an image signal provided from the controller 7. The second liquid crystal panel 6 may be any liquid crystal panel with a backlight that can display an image in accordance with an image signal provided from the controller 7.

For example, the controller 7 includes a processor, a memory circuit, a drive circuit for the first liquid crystal panel 2, and a drive circuit for the second liquid crystal panel 6. The controller 7 controls whether to display an image on the first liquid crystal panel 2 and on the second liquid crystal panel 6, and controls images to be displayed on these panels in accordance with a control signal provided from its host controller (not shown). The controller 7 turns on and off the first light source 4 and the second light source 5, or adjusts the amount of light to be emitted when turning on the first light source 4 and the second light source 5. For example, the controller 7 adjusts the amount of light emitted from the first light source 4 and the second light source 5 by pulse-width modulation (PWM).

The controller 7 controls an image to appear on the first liquid crystal panel 2, an image to appear on the second liquid crystal panel 6, and turns on and off the first light source 4 and the second light source 5 to switch images and patterns viewable by the viewer in various combinations of the images and patterns.

Figure 4A:
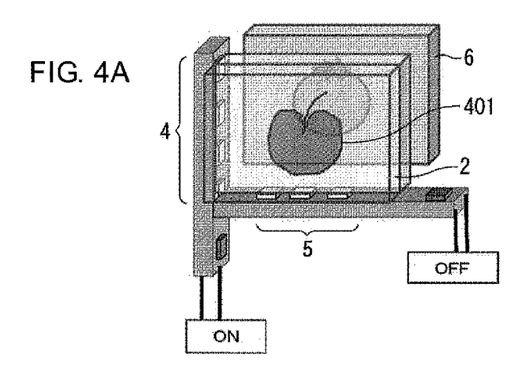
FIGS. 4A to 4C are diagrams each showing the display states of a first liquid crystal panel and a second liquid crystal panel either displaying an image or displaying no image, the combinations of the on or off states of a first light source and a second light source, and the resultant display content viewable by a viewer in one example.
Figure 4B:
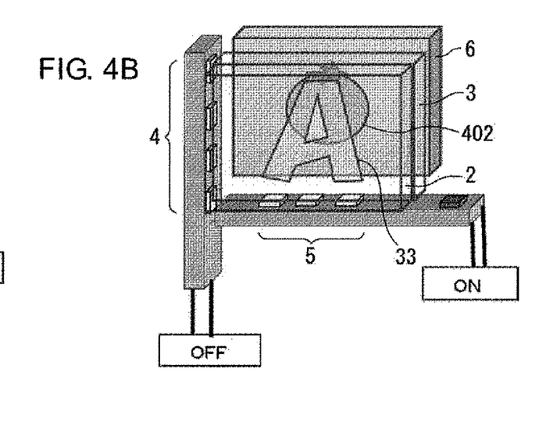
Figure 4C:
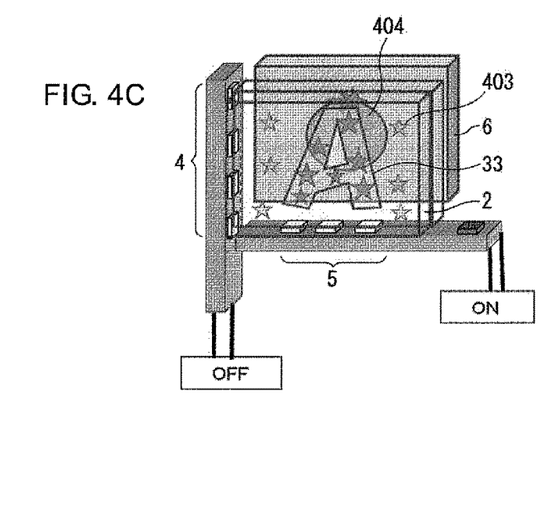

FIGS. 4A to 4C are diagrams each showing the display states of the first liquid crystal panel 2 and the second liquid crystal panel 6 either displaying an image or displaying no image, the combinations of the on or off states of the first light source 4 and the second light source 5, and the resultant display content viewable by the viewer in one example.

In the example shown in FIG. 4A, the first liquid crystal panel 2 displays an image, and the first light source 4 is on. The second light source 5 is off. The second liquid crystal panel 6 may or may not display an image.

In this case, the entire display area of the first liquid crystal panel 2 is illuminated with the light emitted from the first light source 4, allowing the viewer to view an image 401 displayed on the first liquid crystal panel 2. The visibility of the image appearing on the second liquid crystal panel 6 changes depending on the amount of light from the first light source 4 and the transmittance of the first liquid crystal panel 2 determined by an image displayed on the first liquid crystal panel 2. More specifically, the image on the second liquid crystal panel 6 becomes more difficult to view as the amount of light from the first light source 4 is larger, or as the transmittance of the first liquid crystal panel 2 is lower.

In the example shown in FIG. 4B, the first liquid crystal panel 2 displays no image, and is transparent. The first light source 4 is off. The second light source 5 is on. The second liquid crystal panel 6 may or may not display an image.

In this case, with the light emitted from the second light source 5, the pattern 33 arranged on the light guide plate 3 is viewable by the viewer. When the second liquid crystal panel 6 displays an image 402, the viewer can further view the image 402 together with the pattern 33 superimposed on the image 402.

In the example shown in FIG. 4C, the first liquid crystal panel 2 displays an image. The first light source 4 is off. The second light source 5 is on. The second liquid crystal panel 6 may or may not display an image.

In this case, the display area of the first liquid crystal panel 2 is illuminated with the light in correspondence with the pattern 33 or the image displayed on the second liquid crystal panel 6, allowing the viewer to view an image 403 displayed on the first liquid crystal panel 2. With the light emitted from the second light source 5, the pattern 33 arranged on the light guide plate 3 is also viewable by the viewer. Thus, the viewer can view the image 403 together with the pattern 33 superimposed on the image 403. Additionally, when the second liquid crystal panel 6 displays an image 404, and the transmittance of the first liquid crystal panel 2 determined by the image 403 is sufficiently high to allow the viewer to view the image 404, the viewer can view an image including the pattern 33 and the two images 403 and 404 that are superimposed on one another.

As described above, the display device switches the light sources to emit light and thus switches the display content viewable by the viewer between the image(s) displayed on the liquid crystal panel(s) alone, the pattern formed on the light guide plate, and an image including the image(s) on the liquid crystal panel(s) and the pattern on the light guide plate that are superimposed on one another. This display device enables various displays, and enhances visual effects.

Figure 5:
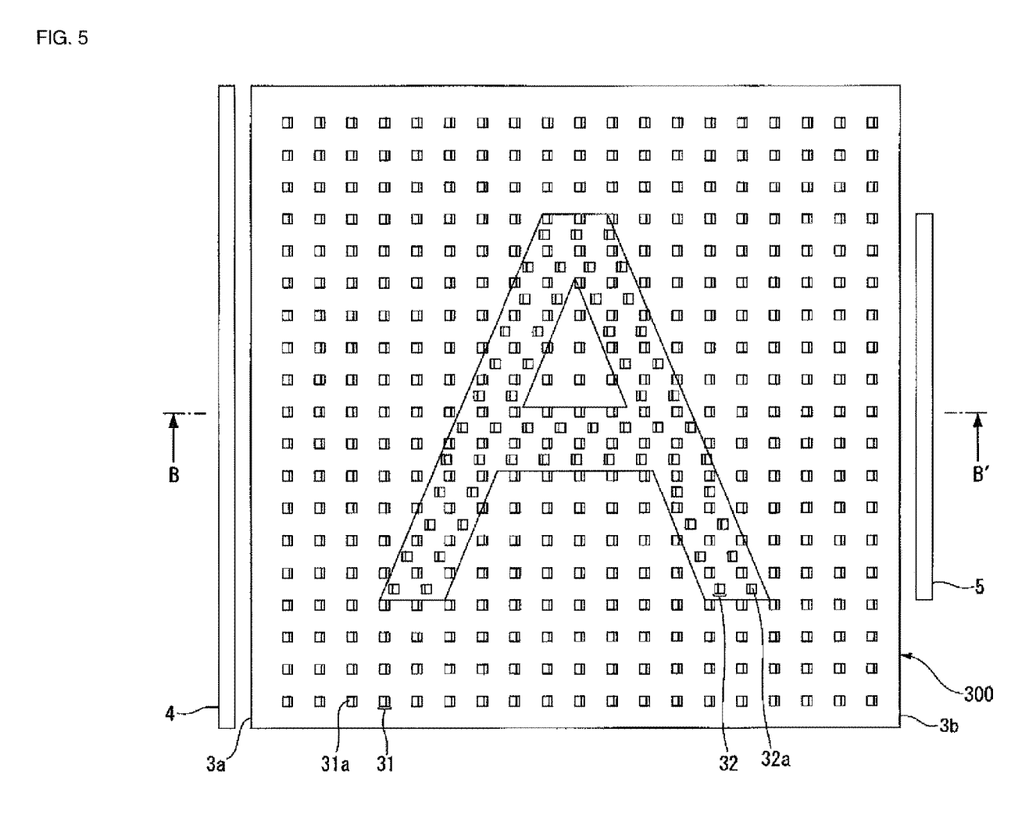
FIG. 5 is a schematic front view of a light guide plate according to a modification.

In a modification, the first light source 4 and the second light source 5 may be arranged to face each other across the light guide plate 3.

Figure 6:
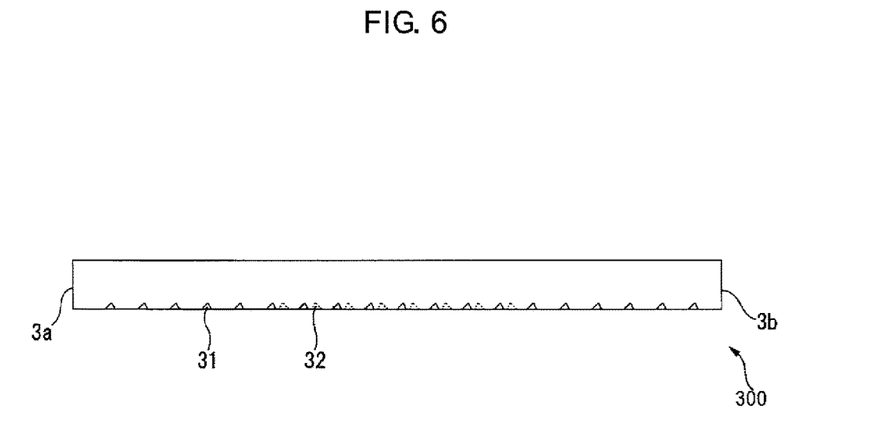
FIG. 6 is a schematic sectional side view of the light guide plate taken along line B-B' in FIG. 5.

FIG. 5 is a schematic front view of a light guide plate 300 according to the modification. FIG. 6 is a schematic sectional side view of the light guide plate 300 taken along line B-B' in FIG. 5. The light guide plate 300 differs from the light guide plate 3 shown in FIGS. 2 and 3 in the position of its incident surface 3b with respect to the second light source 5, and the orientation of each of its prisms 32 toward light emitted from the second light source 5. The incident surface 3b and the prisms 32 will now be described.

The light guide plate 300 of this modification has an incident surface 3a facing the first light source 4 on one side wall, and the incident surface 3b facing the second light source 5 on another side wall facing the side wall on which the incident surface 3a is formed. In this modification as well, the incident surface 3b may be a convex surface toward the second light source 5 to function as a collimating lens, which will enhance the directivity of incident light from the second light source 5.

In the same manner as in the above embodiment, the light guide plate 300 has a diffusion surface 3c at its back, on which a plurality of first prisms 31 are formed to reflect light emitted from the first light source 4 toward the first liquid crystal panel 2 and a plurality of second prisms 32 are formed to reflect light emitted from the second light source 5 toward the first liquid crystal panel 2.

The plurality of second prisms 32 are arranged in a zigzag with a predetermined pitch. The second prisms 32 are arranged in the pattern 33 to allow light reflected by the second prisms 32 to be emitted from the emission surface 3d in the pattern 33. The second prisms 32 may be arranged in a lattice with a predetermined pitch in the pattern 33. Each second prism 32 is arranged to have its reflective surface 32a facing the second light source 5. In this modification, the first light source 4 and the second light source 5 are arranged to face each other. As a result, the reflective surface 31a of each first prism 31 and the reflective surface 32a of each second prism 32 are also rotated by 180 degrees on a plane parallel to the diffusion surface 3c. In this modification, to prevent the first prisms 31 from reflecting light emitted from the second light source 5 toward the emission surface 3d, the surface of each first prism 31 facing the second light source 5 forms an angle of, for example, 70 to 90 degrees with the diffusion surface 3c. In the same manner, to prevent the second prisms 32 from reflecting light emitted from the first light source 4 toward the emission surface 3d, the surface of each second prism 32 facing the first light source 4 forms an angle of, for example, 70 to 90 degrees with the diffusion surface 3c.

In the same manner as in the above embodiment, the display device in this modification turns on and off the first light source 4 and the second light source 5 to switch the display content viewable by the viewer.

In this modification, a plurality of prisms may be arranged on the entire diffusion surface 3c in a lattice or in a zigzag with a predetermined pitch. These prisms may include prisms arranged in the pattern 33 to function both as the first prisms 31 and the second prisms 32. The other prisms may function only as the first prisms 31.

Figure 7A:
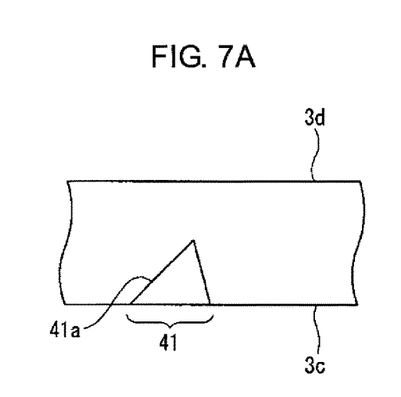
FIG. 7A is a side view of a prism functioning only as a first prism.
Figure 7B:
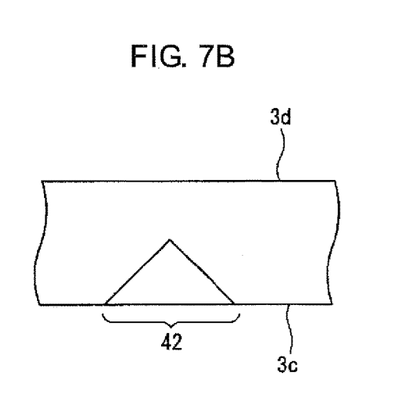
FIG. 7B is a side view of a prism functioning as both the first prism and a second prism.

FIG. 7A is a side view of a prism 41 that functions only as a first prism 31. FIG. 7B is a side view of a prism 42 that functions both as a first prism 31 and a second prism 32.

The surface of the prism 41 facing the first light source 4 is a reflective surface 41a, which forms an angle (e.g., 40 to 50 degrees) with the diffusion surface 3c to totally reflect light from the first light source 4 entering the light guide plate 3 toward the emission surface 3d. The surface of the prism 41 facing the second light source 5 forms an angle of 70 to 90 degrees with the diffusion surface 3c to prevent reflection of light from the second light source 5 entering the light guide plate 3 toward the emission surface 3d.

In contrast, the surfaces of the prism 42 facing the first light source 4 and the second light source 5 both function as reflective surfaces. These surfaces form an angle with the diffusion surface 3c to orient light from the light sources entering the light guide plate 3 toward the emission surface 3d.

In this modification, the prisms arranged in correspondence with the pattern and the prisms in the area with no pattern may have substantially the same layout density. This may prevent areas of an image on the second liquid crystal panel 6 from being viewed differently between the area with the pattern and the area with no pattern when the first light source 4 and the second light source 5 are turned off to allow the image to be viewable by the viewer through the light guide plate and the first liquid crystal panel.

Figure 8:
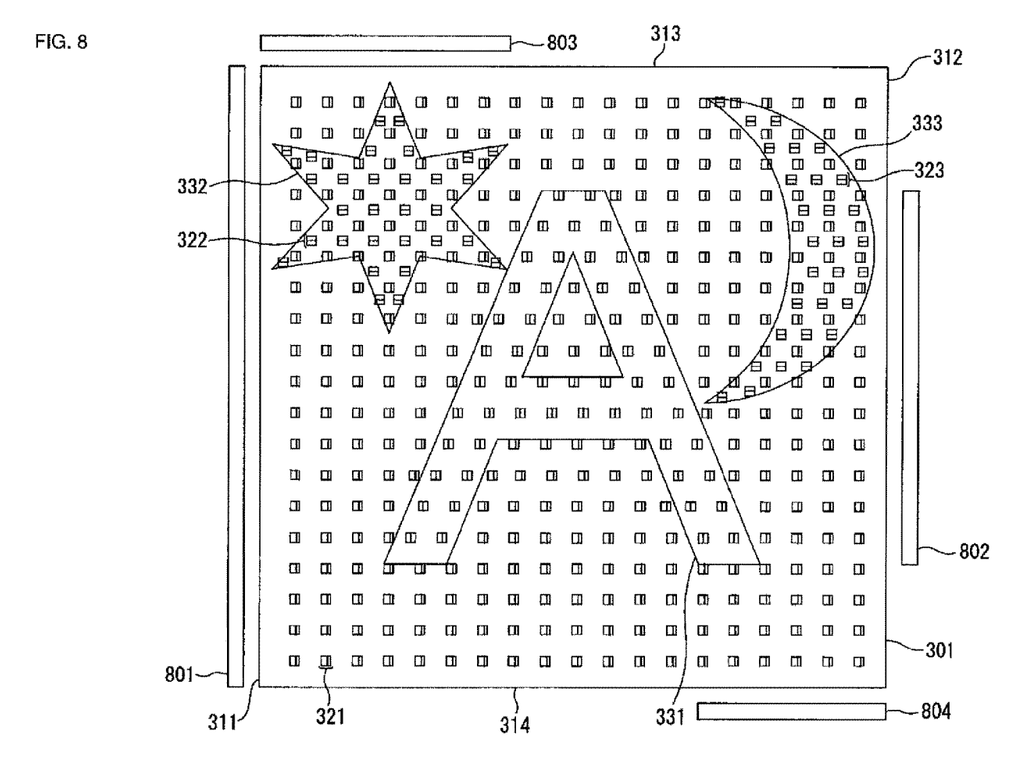
FIG. 8 is a schematic front view of a light guide plate showing the arrangement of the light guide plate and the light sources according to another modification.

In another modification, the light guide plate may have two or more patterns. In this case, the display device may include separate light sources for the respective patterns formed on the light guide plate, in addition to a light source for illuminating the entire display area of the first liquid crystal panel.

FIG. 8 is a schematic front view of a light guide plate showing the arrangement of the light guide plate and the light sources. In this modification, a light guide plate 301 has three patterns 331 to 333. The light guide plate 301 is surrounded by four light sources 801 to 804. More specifically, the light source 801 is arranged to face an incident surface 311 on one side wall of the light guide plate 301. The light source 802 is arranged to face an incident surface 312 on another side wall facing the incident surface 311. Further, the light source 803 is arranged to face an incident surface 313 on one side wall of the light guide plate 301 orthogonal to the incident surface 311. The light source 804 is arranged to face an incident surface 314 on another side wall facing the incident surface 313.

To illuminate the entire display area of the first liquid crystal panel 2 with light from the light source 801 entering the light guide plate 301 through the incident surface 311, a plurality of prisms 321, each of which has a reflective surface facing the light source 801, are arranged in a lattice with a predetermined pitch across the entire diffusion surface at the back of the light guide plate 301. These prisms 321 include prisms arranged in the pattern 331, each of which has a reflective surface facing a light source 802 to reflect light from the light source 802 toward the first liquid crystal panel.

On the diffusion surface, a plurality of prisms 322, each of which has a reflective surface facing the light source 803, are further arranged in a zigzag with a predetermined pitch in a pattern 332 to reflect light from the light source 803 incident on the incident surface 313. As a result, the light is emitted from the emission surface in the pattern 332. On the diffusion surface, a plurality of prisms 323, each of which has a reflective surface facing the light source 804, are arranged in a zigzag with a predetermined pitch in a pattern 333 to reflect light from the light source 804 incident on the incident surface 314. As a result, the light is emitted from the emission surface in the pattern 333.

In this modification, the controller turns on and off the light sources to switch an image to appear on the first liquid crystal panel or to switch a pattern to be superimposed on the image appearing on the second liquid crystal panel. The display device according to this modification thus enhances visual effects further.

In another modification, the display device may include another display, such as an organic electroluminescent (EL) display to replace the second liquid crystal panel. The display device may include a stereoscopic video projector that can project a stereoscopic video to replace the second liquid crystal panel. The display device may include a stereoscopic video projector using, for example, lenticular lenses, integral photography, or holographic displays. In this case, the stereoscopic video projector may project a stereoscopic video at a position nearer a viewer than the first liquid crystal panel through the light guide plate and the first liquid crystal panel. The display device improves a sense of reality by projecting a stereoscopic video, and thus enhances visual effects further.

In the above embodiments and modifications, the display device may be mounted on a game machine, such as a pinball game machine or a reel-type game machine.

Figure 9:
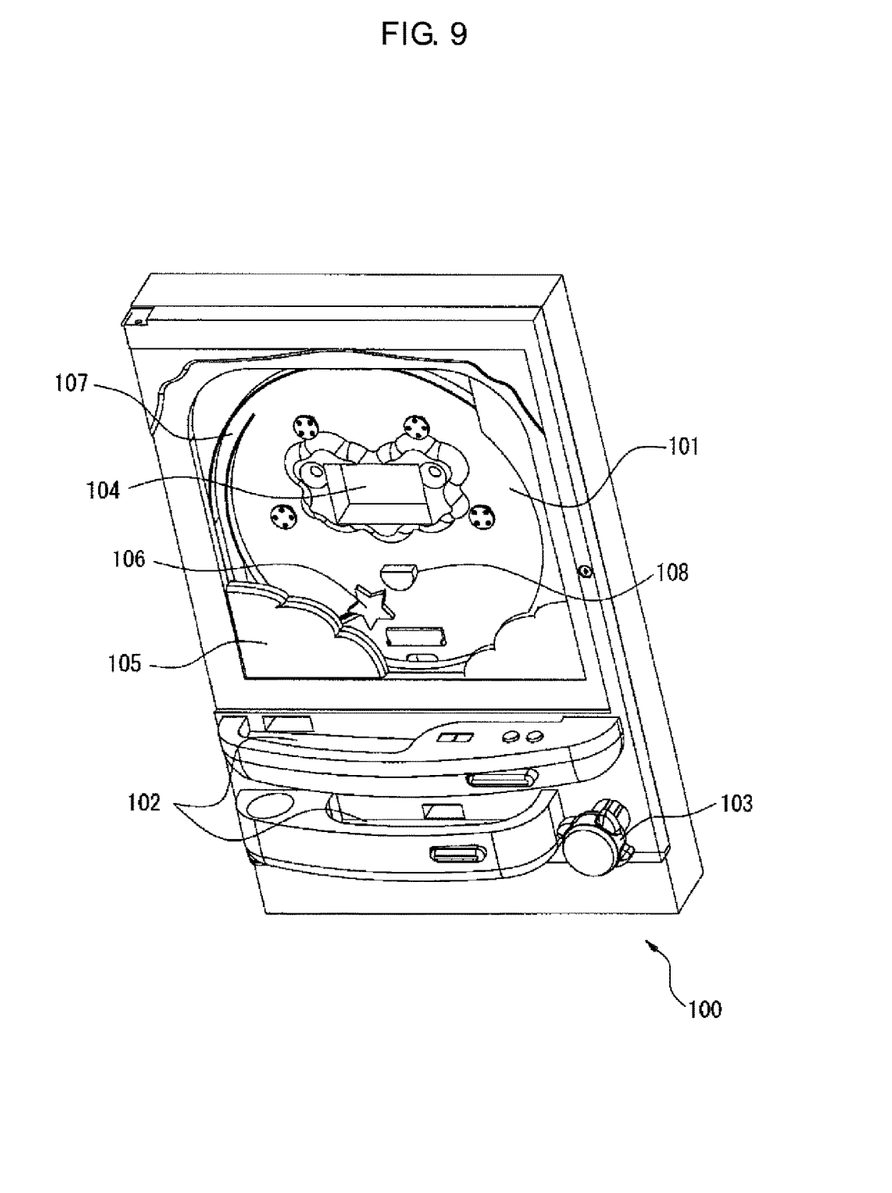
FIG. 9 is a schematic perspective view of a pinball game machine including a display device according to the embodiments or modifications as viewed from the player side.

FIG. 9 is a schematic perspective view of a pinball game machine 100 including the display device according to the above embodiments or modifications as viewed from the player (viewer) side. As shown in FIG. 9, the pinball game machine 100 includes a game board 101, which is a machine body occupying an upper and middle portion of this machine, a ball receiving tray 102, which is arranged below the game board 101, an operation unit 103 with a handle, and a display device 104 arranged substantially in the center of the game board 101.

To produce play effects, the pinball game machine 100 further includes a stationary accessory unit 105 on the front surface of the game board 101 in a lower part of the game board 101, and a movable accessory unit 106 between the game board 101 and the stationary accessory unit 105. A rail 107 is further arranged at the periphery of the game board 101. Many obstacle pins (not shown) and at least one win pocket 108 are arranged on the game board 101.

The operation unit 103 shoots a game ball from a launcher device (not shown) with a predetermined force in accordance with the degree of rotation of the handle operated by the player. Each shot game ball moves upward along the rail 107 and then falls as it passes between many obstacle pins. When a sensor (not shown) detects a ball that has fallen into any of the win pockets 108, a main control circuit (not shown) mounted on the back surface of the game board 101 dispenses a predetermined number of game balls in accordance with the win pocket 108 receiving the game ball from a ball dispenser device (not shown) onto the ball receiving tray 102. The main control circuit further drives the display device 104 with a CPU (not shown) dedicated to producing visual effects, which is mounted on the back surface of the game board 101.

The display device 104 is an example of the display device according to the above embodiments or modifications. The display device 104 is mounted on the game board 101 to have the front surface of the first liquid crystal panel facing the player. The controller of the display device 104 displays various images on the display panels of the display device 104, or turns on and off the light sources in response to control signals from the CPU for visual effects provided in accordance with the playing operation.

As described above, the embodiments may be modified variously by those skilled in the art without departing from the scope and spirit of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 display device
2 first liquid crystal panel
3 light guide plate
3a, 3b incident surface
3c diffusion surface
3d emission surface
31 first prism
32 second prism
33 pattern
4 first light source
second light source
6 second liquid crystal panel
7 controller
300, 301 light guide plate
331 to 333 pattern
311 to 314 incident surface
321 to 323 prism
801 to 804 light source
100 pinball game machine
101 game board
102 ball receiving tray
103 operation unit
104 display device
105 stationary accessory unit
106 movable accessory unit
107 rail
108 win pocket

The invention claimed is:

1. A display device, comprising:
   a display panel including an image display area in which an image is displayable;
   a light guide plate arranged at a back of the display panel, the light guide plate comprising a transparent material and having a first incident surface and a second incident surface;
   a first light source facing the first incident surface;
   a second light source facing the second incident surface; and
   a controller configured to control turning on and turning off of the first light source and the second light source and to control an image displayed on the display panel,
   wherein the light guide plate includes
   an emission surface facing the display panel,
   a plurality of first prisms arranged in an area in correspondence with the image display area on a surface opposite to the emission surface,
   where the plurality of first prisms are configured to reflect light emitted from the first light source and entering the guide plate through the first incident surface toward the emission surface to illuminate the entire display area of the display panel with the light emitted from the first light source and entering the guide plate through the first incident surface, and
   a plurality of second prisms arranged on the surface opposite to the emission surface in a first pattern of light emitted from the second light source and entering the guide plate through the second incident surface,
   where the plurality of second prisms are configured to reflect light emitted from the second light source and entering the guide plate through the second incident surface toward the emission surface to cause the first pattern of light to be superimposed in the image display area of the display panel.

2. The display device according to claim 1, further comprising:
   a second display panel arranged at a back of the light guide plate to display an image viewable through the light guide plate and the display panel,
   wherein the controller is configured to control an image displayed on the second display panel.

3. The display device according to claim 1, further comprising:
   a third light source facing a third incident surface different from the first incident surface and the second incident surface of the light guide plate,
   wherein the light guide plate includes a plurality of third prisms arranged on the surface opposite to the emission surface in a second pattern of light emitted from the third light source and entering the light guide plate through the third incident surface,
   wherein the plurality of third prisms are configured to reflect light emitted from the third light source and entering the light guide plate through the third incident surface toward the emission surface to allow the second pattern of light to be superimposed in the image display area of the display panel, and the second pattern is different from the first pattern, and
   wherein the controller is configured to control turning on and turning off of the third light source.

4. A game machine, comprising:
   a game machine unit; and
   the display device according to claim 1 arranged on a surface of the game machine unit to face a player of the game machine.

5. The display device according to claim 2, further comprising:
   a third light source facing a third incident surface different from the first incident surface and the second incident surface of the light guide plate,
   wherein the light guide plate includes a plurality of third prisms arranged on the surface opposite to the emission surface in a second pattern of light emitted from the third light source and entering the light guide plate through the third incident surface, wherein the plurality of third prisms are configured to reflect light emitted from the third light source and entering the light guide plate through the third incident surface toward the emission surface to allow the second pattern of light to be superimposed in the image display area of the display panel, and the second pattern is different from the first pattern, and wherein the controller is configured to control turning on and turning off of the third light source.

6. A game machine, comprising:
a game machine unit; and
the display device according to claim 2 arranged on a surface of the game machine unit to face a player of the game machine.

7. A game machine, comprising:
a game machine unit; and
the display device according to claim 3 arranged on a surface of the game machine unit to face a player of the game machine.

* * * * *